United States Patent
Tennant et al.

(10) Patent No.: US 7,194,151 B2
(45) Date of Patent: Mar. 20, 2007

(54) OPTICAL MEDIA DETECTOR AND METHOD OF OPERATION THEREOF

(75) Inventors: Alan W. Tennant, Kinross (GB); Eric G. Lyons, Dundee (GB)

(73) Assignee: NCR Corporation, Dayton, OH (US)

( * ) Notice: Subject to any disclaimer, the term of this patent is extended or adjusted under 35 U.S.C. 154(b) by 63 days.

(21) Appl. No.: 10/922,485

(22) Filed: Aug. 20, 2004

(65) Prior Publication Data
US 2005/0041904 A1 Feb. 24, 2005

(30) Foreign Application Priority Data
Aug. 23, 2003 (GB) .................................. 0319881.9

(51) Int. Cl.
*G02B 6/00* (2006.01)
(52) U.S. Cl. ......................................... 385/12; 385/147
(58) Field of Classification Search .................. 385/12, 385/13, 147
See application file for complete search history.

(56) References Cited

U.S. PATENT DOCUMENTS

| 3,699,421 | A | * | 10/1972 | Stempler et al. ............ 318/640 |
| 4,149,802 | A |   | 4/1979  | Dorn et al. |
| 6,259,100 | B1 |  | 7/2001  | Cross |
| 6,566,672 | B1 |  | 5/2003  | Schlough et al. |

FOREIGN PATENT DOCUMENTS

| DE | 4239086 A | 5/1994 |
| EP | 0 146 917 A3 | 7/1985 |
| WO | WO 95/16909 A1 | 6/1995 |

OTHER PUBLICATIONS

Patent Abstracts of Japan, vol. 1998, No. 13, Nov. 30, 1998 & JP 10 218430 A (Oki Electric Ind Co Ltd), Aug. 18, 1998.
Patent Abstracts of Japan, vol. 0183, No. 68 (M-1637), Jul. 12, 1994 & JP 6 100205 A (Oki Electric Ind Co Ltd), Apr. 12, 1994.
Patent Abstracts of Japan, vol. 0112, No. 66 (M-620), Aug. 28, 1987 & JP 62 070146 A (Nec Corp), Mar. 31, 1987.
Patent Abstracts of Japan, vol. 0122, No. 74 (M-725), Jul. 29, 1988 & JP 63 057457 A (Toyo Seikan Kaisha Ltd), Mar. 12, 1988.

* cited by examiner

*Primary Examiner*—Kevin S. Wood
(74) *Attorney, Agent, or Firm*—Priest & Goldstein, PLLC

(57) ABSTRACT

An optical media detector, for use in a media transport mechanism, the detector comprising a light source and an optical sensor, is described. The light source and sensor are optically coupled via two distinct optical paths which are formed in part by a pair of optical light guides, each of which is formed into part of a pinch roller adapted to contact or being close to contacting media being transported.

20 Claims, 7 Drawing Sheets

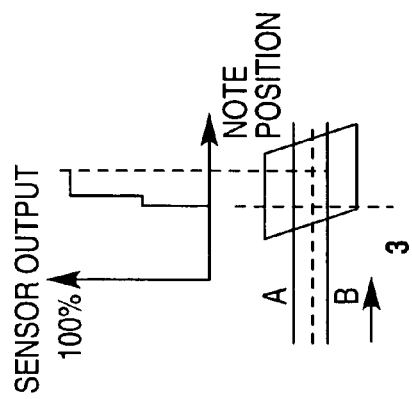
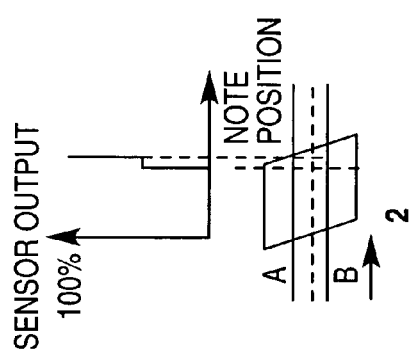
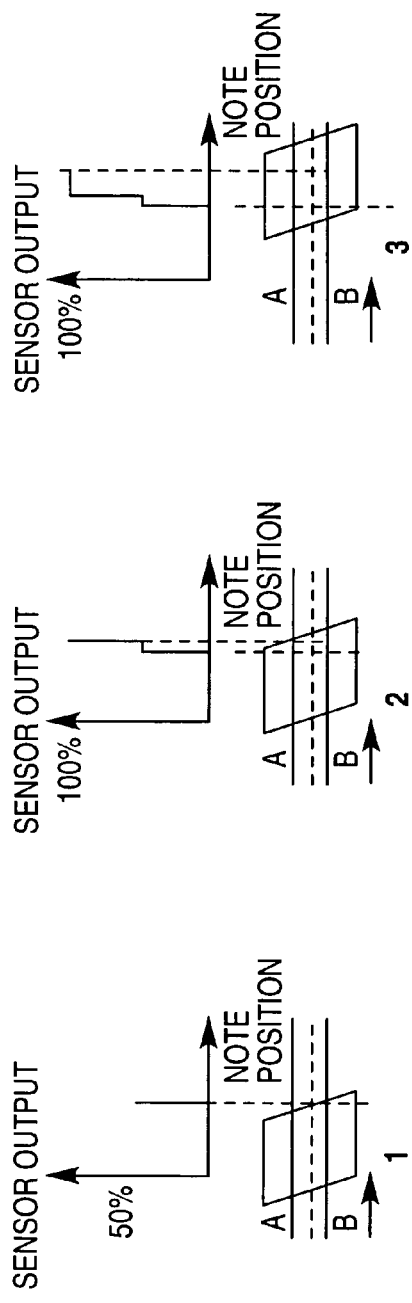
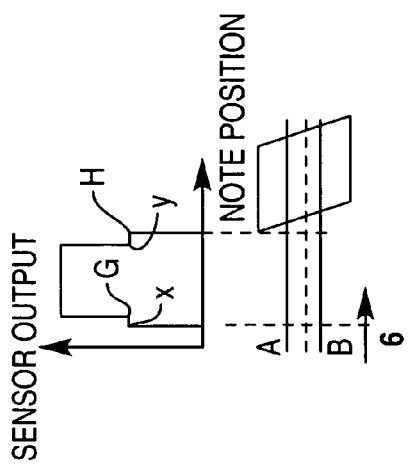
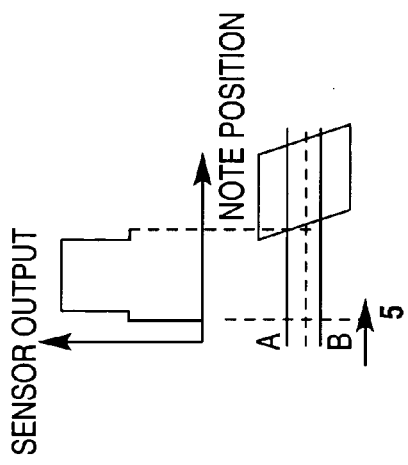
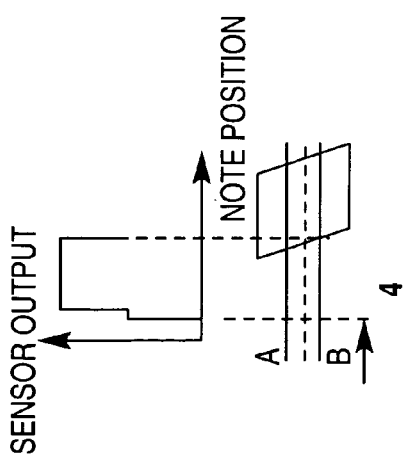

OPTICAL MEDIA DETECTOR AND METHOD OF OPERATION THEREOF

BACKGROUND OF THE INVENTION

The present invention relates generally to an optical media detector and in particular to a note detector for use in an Automated Teller Machine.

A detector in accordance with the present invention has application, for example, to the detection of skewed bank noted in the transport path of an Automated Teller Machine (ATM). In the cash dispensing mechanism of the aforementioned ATM it is important to provide a simple and reliable means for detecting skewed notes. Notes can become skewed as they are transported from a note storage cassette to the output slot of the ATM, as can notes deposited by a user and it is equally important to detect skew in notes being deposited in the ATM.

A variety of different prior art detectors have been utilized to detect note skew in ATMs. These include both electro-mechanical and optical detectors. However, they all have certain features in common. In particular, they all rely on a pair of sensors, each of which is located at a predetermined position along the transport path within the ATM. Also as the detector is arranged to determine skew perpendicular to the direction of travel along the transport path, both the sensors and light sources must be located within the transport path, thus making assembly and serviceability of the detectors difficult. For example, cables must be laid into both sides of the transport path to connect to the sensors.

In addition, bank notes, particularly street quality bank notes can be wrinkled and/or overlapped to some degree. When more than one such note is superimposed, the physical contact between the surfaces of the notes is unpredictable. A reduction in the intensity of transmitted light has been observed in areas where contact has been lost. Additionally, the exact position of the note within the air gap between planar light guides has been seen to affect the intensity of the transmitted light. The light beams spread as they travel between the top and the bottom light guides which reduces the light intensity falling in the receiving guide. The larger the size of the air gap between planar light guides the larger the light intensity loss.

SUMMARY OF THE INVENTION

It is an object of the present invention to produce an improved optical media detector.

According to a first aspect of the present invention there is provided an optical media detector, for use in a media transport mechanism, the detector comprising a light source and an optical sensor, which are optically coupled via two distinct optical paths which are formed in part by a pair of optical light guides, each of which is formed into part of a pinch roller, said pinch rollers each being adapted to contact media being transported.

Preferably, each light guide is formed so as to provide two optical paths between the light source and the optical sensor.

Most preferably, each of the light guides is formed with a substantially cylindrical cross-section. Furthermore, the portion of the light guide with a substantially cylindrical cross-section may form part of the surface of the pinch roller.

Alternatively, and more preferably, the light guides are each recessed, of the order of 1 mm, relative to the surface of the pinch roller.

This allows for a gap through which the media is transported of the order of 2 mm. In prior art detectors the gap would be of the order of 20 mm. This clearly constitutes a significant improvement over prior art detectors.

Preferably, the surfaces of the light guides contact the media when in use.

Preferably, the light guides are formed from a plastics material.

Preferably, the optical sensor is a single optical sensor and the light-guides are optical wave-guides.

Most preferably, control means are arranged to provide double pick information based on the signal produced.

Preferably, the detector, when in use, is arranged such that the sensor receives light via each optical path, the output of the sensor being dependent on whether or not a note is present in either or both optical paths.

Preferably, the control means is further arranged as to the degree of skew of a note based on the signal produced.

Preferably, the light source is a Light Emitting Diode (LED).

According to a second aspect of the present invention there is provided a note skew detector, for use in a note transport mechanism of an Automated Teller Machine (ATM) the detector comprising a light source and a single optical sensor, optically coupled via two pairs of optical wave-guides each of which is formed in part of a pinch roller, each of said rollers being adapted to contact media being transported, the wave-guides being further arranged to provide a first optical path and a second, distinct, optical path between said light source and said sensor.

Preferably the light guides are each recessed, of the order of 1 mm, relative to the surface of the pinch roller.

Alternatively, the portion of the light guide with a substantially cylindrical cross-section may form part of the surface of the pinch roller.

According to a third aspect of the present invention there is provided an Automated Teller Machine (ATM) having an optical media detector as claimed in any preceding claim, wherein the light source is located outside of the note transport path of the ATM.

According to a fourth aspect of the present invention there is provided an Automated Teller Machine (ATM) having an optical media detector as claimed in any of claims 1 to 13, wherein the single sensor is located outside of the note transport path.

According to a fifth aspect of the present invention there is provided a method of detecting skew in a bank note, being transported along the transport path of a note transport mechanism, utilizing an optical media detector comprising a light source and an optical sensor, which are optically coupled via light guides arranged to transmit light from the source to the sensor via two distinct optical paths, each of said light guides being formed in part of a pinch roller, each of said rollers being adapted to contact media being transported, the method comprising detecting an output at the sensor based on light transmitted via both the first and second optical paths.

According to a sixth aspect of the present invention there is provided a method of detecting double picked bank notes, being transported along the transport path of a note transport mechanism, utilizing an optical media detector comprising a light source and an optical sensor, which are optically coupled via light guides arranged to transmit light from the source to the sensor via two distinct optical paths, each of said light guides being formed in part of a pinch roller, each of said rollers being adapted to contact media being transported, the method comprising detecting an output at the sensor based on light transmitted via both the first and second optical paths.

According to a seventh aspect of the present invention there is provided a light guide, for use in a media transport mechanism, the light guide being formed into part of a pinch roller, each of said rollers being adapted to contact media being transported by said transport mechanism, each of said light guides comprising two distinct optical paths.

BRIEF DESCRIPTION OF THE DRAWINGS

An embodiment of the present invention will now be described, by way of example, with reference to the accompanying drawings, in which:

FIGS. 3A to 3F graphically illustrate the output of a detector in accordance with the present invention, during the detection of a skewed bank note.

DETAILED DESCRIPTION

Figure 1:
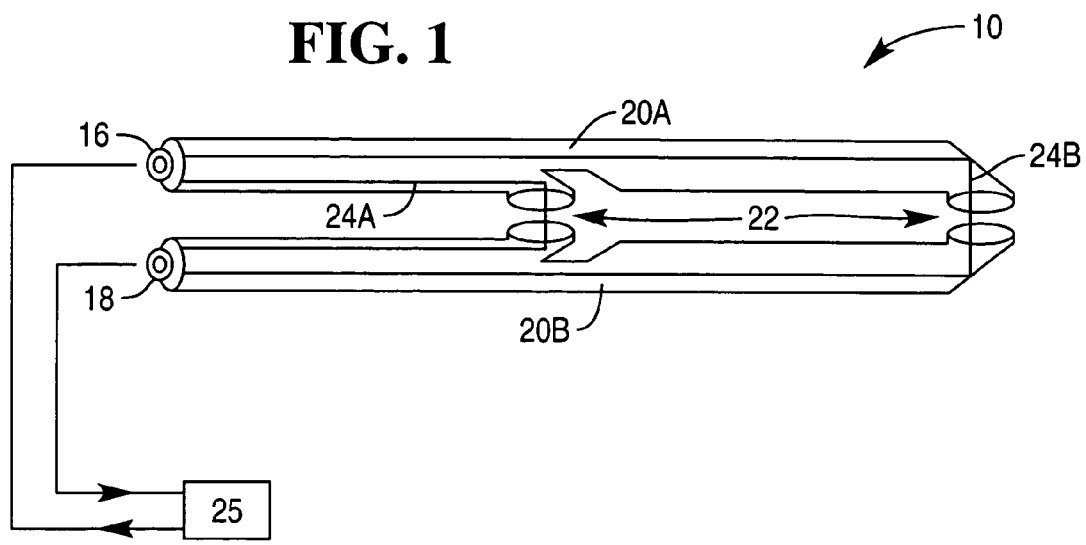
FIG. 1; is a simplified schematic illustration of the optical paths utilized in a note skew detector in accordance with the present invention, as illustrated in FIG. 8.
Figure 8:
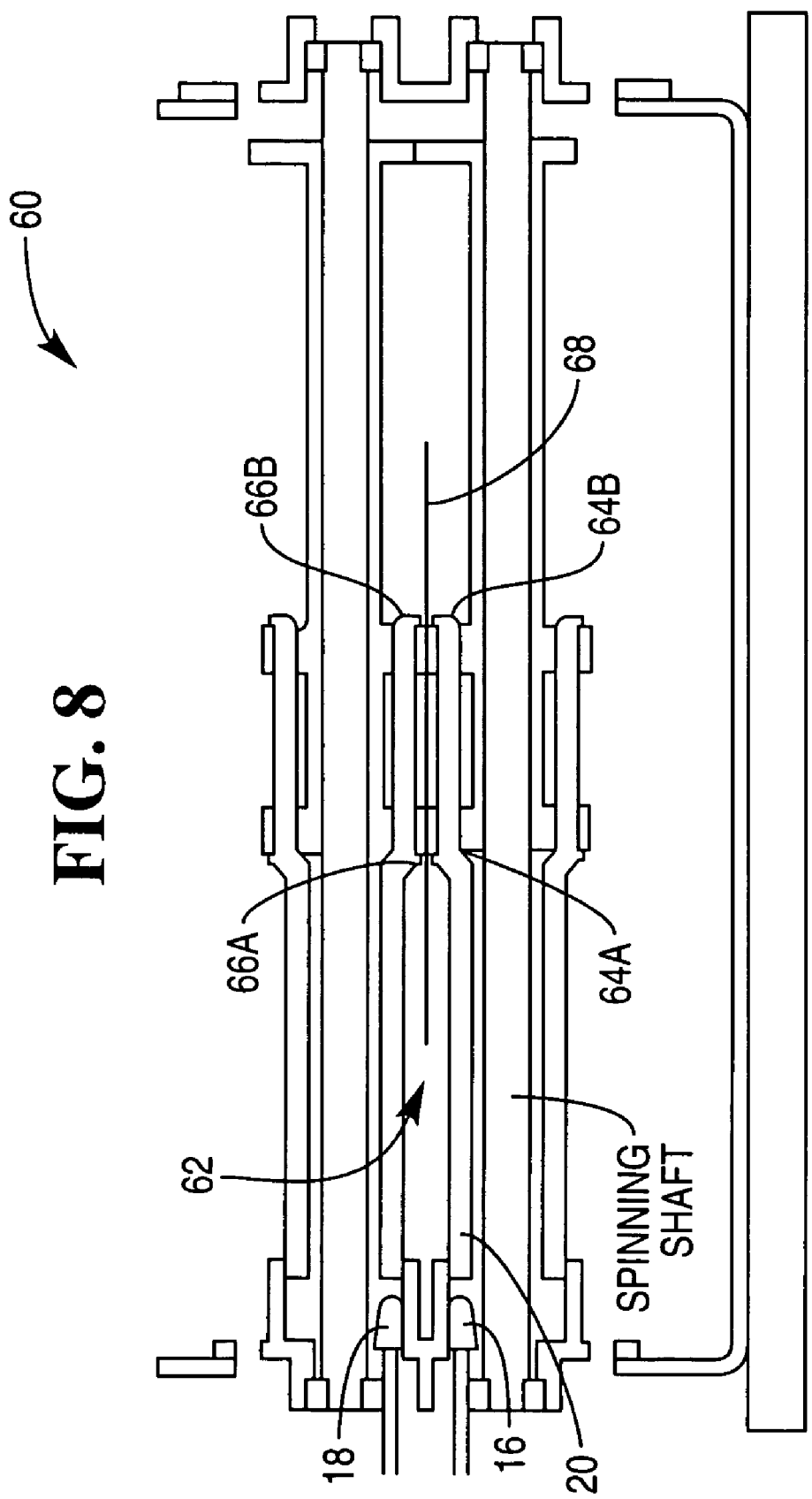
FIG. 8 is a schematic representation of a light guide in accordance with the present invention.

FIG. 1 illustrates the optical paths of the skew note detector 10, as illustrated more accurately in FIG. 8. For completeness FIG. 1, includes an optical sensing means 12, for use in a note transport mechanism 14 of an Automated teller Machine (ATM) (not shown). The detector 10 comprises a light source 16 and a single optical sensor 18, optically coupled via a pair of optical wave-guides 20A, 20B. The wave-guides are arranged to have an air gap 22 there between, so as to provide a note transport path between the said wave-guides. The wave-guides are further arranged to provide a first optical path 24A and a second, distinct, optical path 24B between the light source 16 and the sensor 18. In this way the output of the sensor 18 is dependent on the light transmitted via the wave-guides 20A, 20B to the sensor 18, over both optical paths 24A, 24B. The output of the sensor 18 is fed to a control means 25 arranged to make determinations as to the degree of skew of a note based on the output of the sensor 18, as will be discussed in more detail below, with reference to FIGS. 2 & 3.

Figure 2:
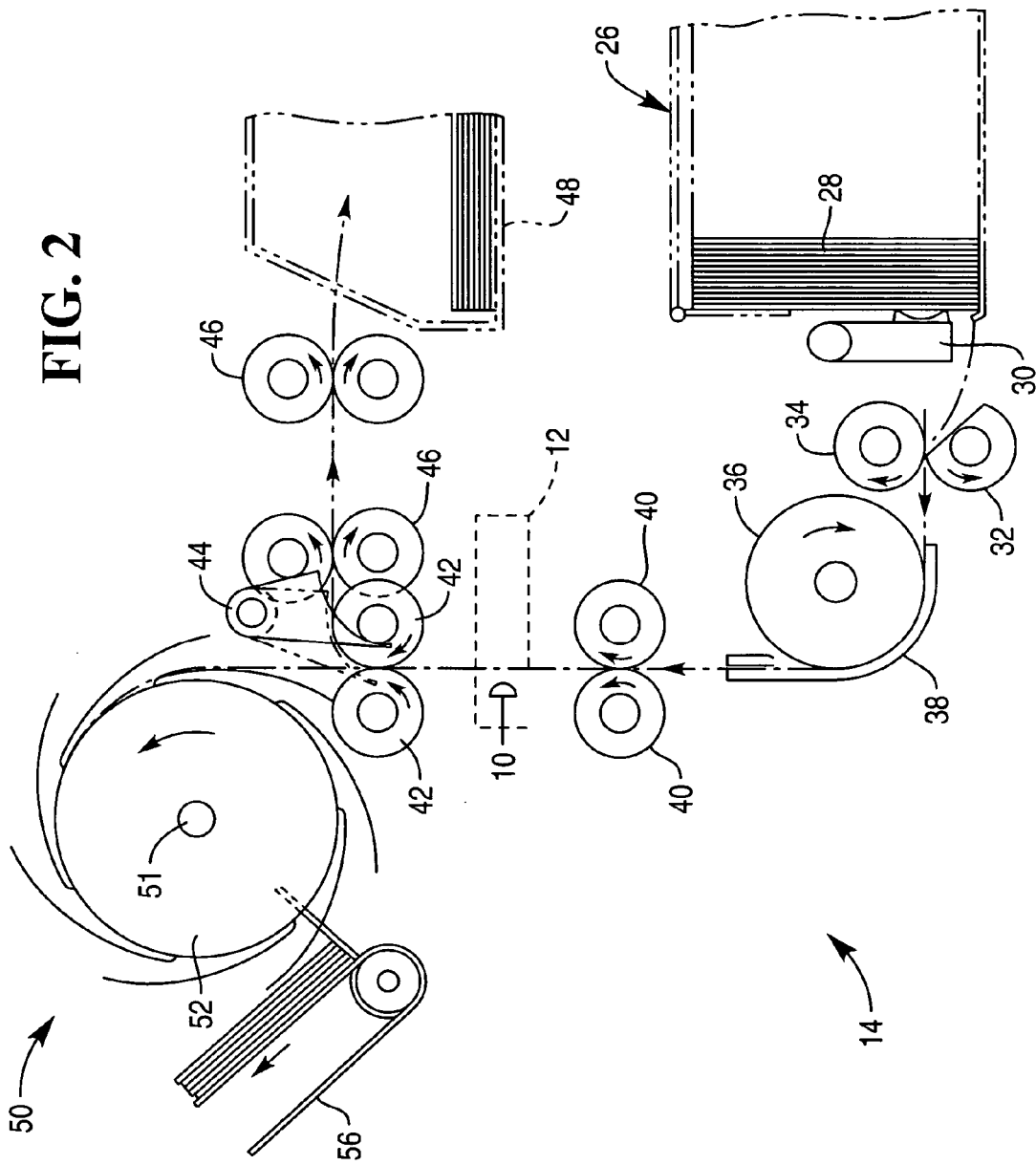
FIG. 2 is a schematic illustration of an Automated Teller Machine (ATM) in accordance with the present invention.

FIG. 2 illustrates the use of the detector 10 in the transport mechanism 14. In addition it illustrates the flexibility of the detector which, in addition to note skew detection can also provide information on double picked notes. The cash transport mechanism of FIG. 2 is part of an ATM cash dispensing mechanism, comprising a currency cassette 26 arranged to contain a stack of currency notes 28 of the same pre-determined denomination supported on their long edges. The cassette 26 is associated with a pick mechanism 30. When one or more currency notes are to be dispensed from the cassette 26 in the course of a cash dispensing operation, the pick mechanism 30 draws out notes one by one from the stack 28, and each note is fed by feed rollers 32, 34, 36 via guide means 38 to feed rollers 40. The direction of feed of the notes is at right angles to their long dimensions. It should be understood that the cash dispensing mechanism 14 could include more than one cassette each associated with a pick mechanism, but in the present embodiment only one cassette and pick mechanism will be described.

Each picked note is passed through the sensing station 12 by the feed rollers 40 and by further feed rollers 42. If a multiple note is detected by the optical system 10, in a manner to be described in more detail below, then a divert gate 44 diverts the multiple note via rollers 46 into a reject bin 48, in a manner known to a skilled person.

If a single note is detected then the note passes on to a stacking wheel 50 to be loaded on to stationary belt means 56. The stacking wheel 50 comprises a plurality of stacking plates 52 spaced apart in parallel relationship along the shaft 51 of the stacking wheel 50. When the required number of notes have been loaded on to the belt means 56, the belt means 56 transports the notes to a cash delivery slot (not shown), again in a manner known to a skilled person, which will not therefore be described further herein.

The detector 10 is positioned within the transport mechanism 14, such that the first and second wave-guides 20A, 20B lie on opposite sides of the transport path. Thus one or more bank notes being transported by the mechanism will pass through the air gap 22 between the wave-guides 20A, 20B. As the source 16 and sensor 18 are arranged at the same side of the transport path all necessary wiring can be located at the one side making assembly and repair considerably easier than in prior art detectors. Hence there is no need to feed wiring into the body of the transport mechanism, as with prior art skew and double pick detectors.

FIGS. 3A to 3F illustrate, the output of the sensor 18 as a skewed note passes through the air gap 22 in the detector 10. A reader may find it more intuitive for the blocking of one optical path (by a bank note) to result in a 50% reduction in the signal from the sensor, as 50% of the light is being blocked. However, a 50% increase is read here only due to an inversion at the detector, as selected by the inventors. The signals illustrated in FIGS. 3A to 3F could be inverted and the system would still function normally.

At point 1) of FIG. 3A a portion of a skewed note covers sensor position B resulting in a 50% sensor output signal.

At point 2), FIG. 3B, the note has moved forward and now covers beam position A as well as position B resulting in a 100% sensor output signal. The interval between the two positions, seen as a flat horizontal line in FIG. 3B, is representative of the skew of the note. The longer the flat horizontal line the greater the note skew.

As seen in FIG. 3C, the skewed note proceeds until, as seen in FIG. 3.D, the trailing edge of the note passes out of the optical path of the detector at point A. At this point, as seen in FIG. 3D, the sensor output again falls to 50%. FIG. 3E illustrates the 50% output from the sensor because once again only one optical path (that at A) is blocked by the note, until that portion of the note also passes out of the optical path and the output falls to 0, as seen in FIG. 3F. The skewed note has left the beam A.

The skew detected at the leading edge and the trailing edge can now be compared for enhanced note information.

In other words, the flat lines at 50% intensity at the beginning and the end of FIG. 3F can be measured to determine the degree of skew. Also, the distances from X to Y and G to H can each be measured to determine the width of the note.

Figure 4:
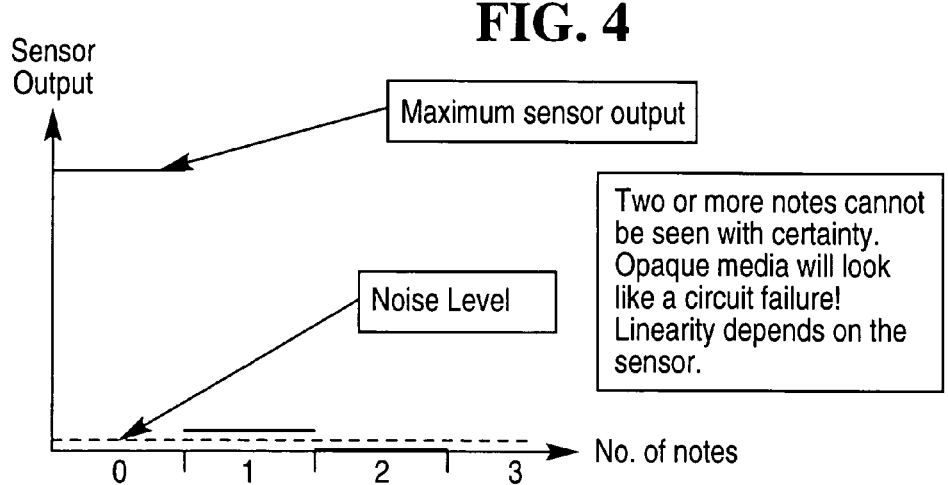
FIG. 4 is a graphical representation of the variable output of a prior art detector, during the detection of a bank note.

FIG. 4 illustrates the output of a prior art non-compensated detector. To obtain maximum contrast between zero, one and two notes the light is set and fixed to an intensity that gives maximum sensor output with no notes present i.e. close to ground or supply. When a note is introduced the light reaching the sensor is reduced, generally from 100% to 5%. The output is now close to the signal noise level. By introducing a further note a similar (20 times) reduction will take place. Output is now 0.25% and cannot be easily discriminated from noise. Thus it can only be said that there is more than one note. Such a system will fail with more opaque media such as Thin Film media.

Also, changes in operation of the light sources or sensors used in such detectors during their lifetime can cause comparable changes in output from detectors leading to false readings.

Figure 5:
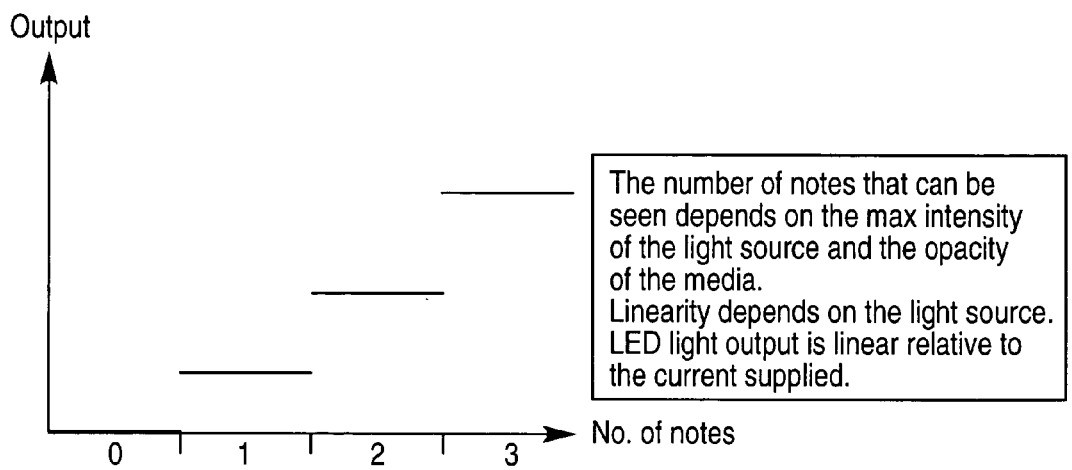
FIG. 5 is a graphical representation of the detector output produced to maintain a substantially constant sensor output when zero, one or more media pass through the detector.

FIG. 5 illustrates a detector in accordance with the present invention in which the output of the sensor is maintained at a constant level by adjusting the supply voltage of the light source when one or more notes is detected.

When no notes are present the output of the detector is maintained at a fixed, low level, say 300 mV by applying a current of 0.12 mA to the light source within the detector. In order to maintain the same sensor output, when a note is placed in the optical path between the light source and the sensor, the current supplied to the light source must be raised, say to 8.0 mA. If a second, superposed note is located between the light source and sensor the input must be raised again, to say 30 mA, in order to maintain the same output from the sensor.

Thus the change in input from zero to one note is almost a 7-fold increase and the increase from one to two notes is more than 4-fold. Thus these increases are much more easily determined than with prior art methods. Thus measuring the input to the light source instead of the output from the sensor provides an improved detector.

With more powerful light sources these current levels would be greater and more linear, therefore, allowing the detection of extremely opaque media.

Figure 6:
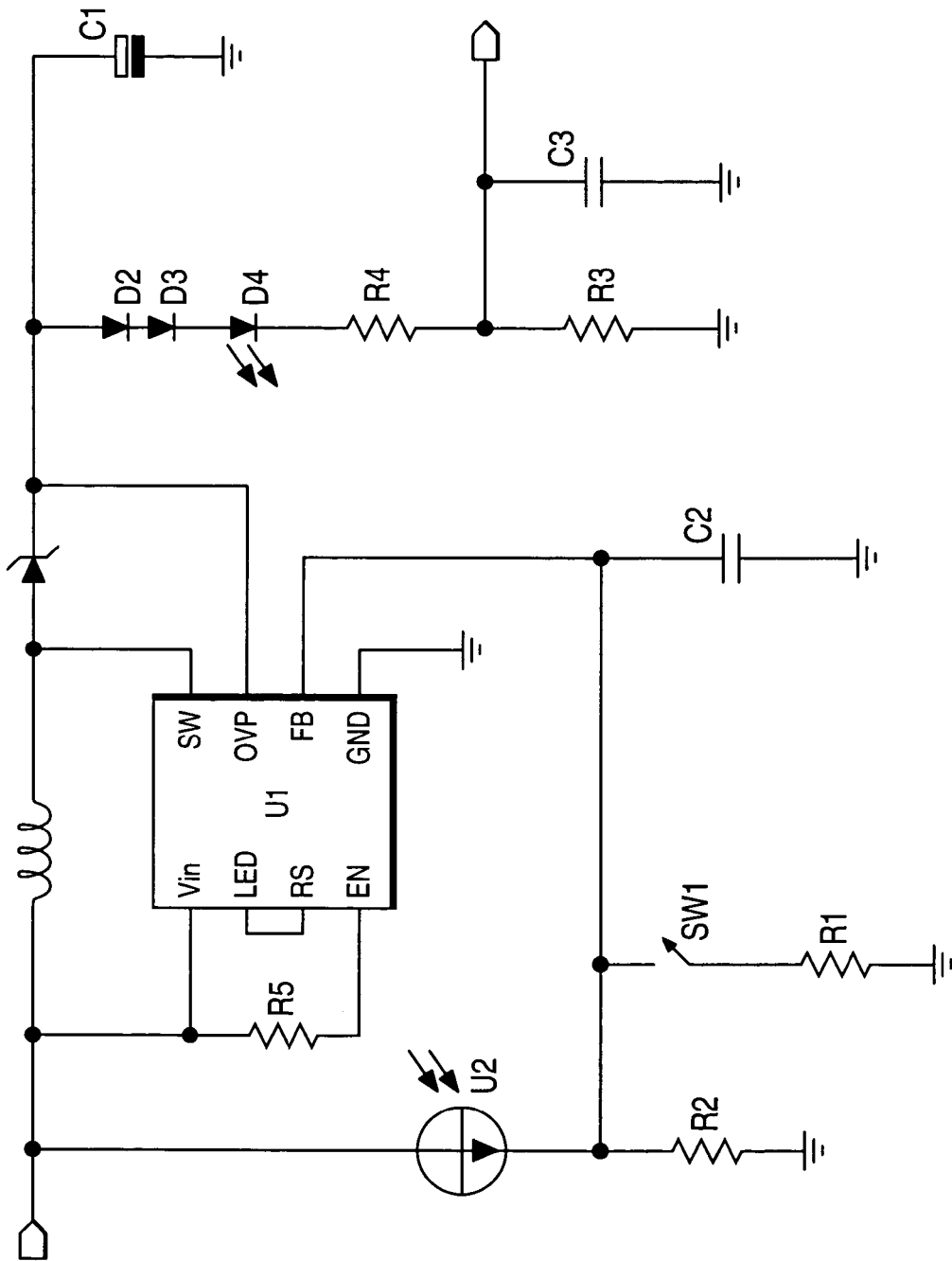
FIG. 6 is a schematic representation of the drive circuitry of a light source and sensor in accordance with the present invention for double detection.
Figure 7A:
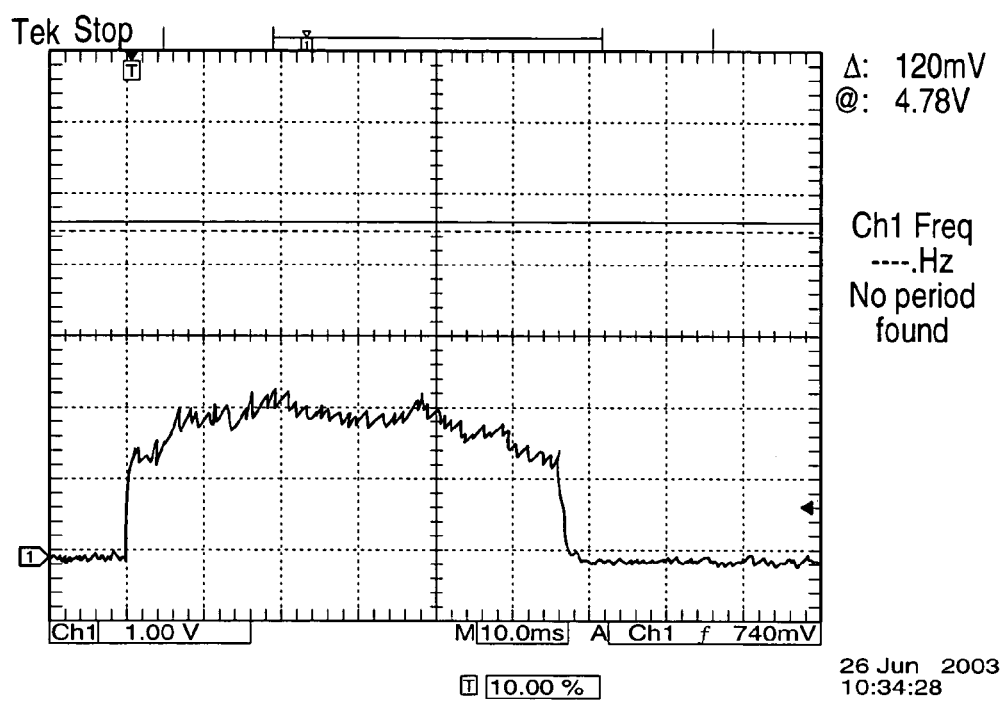
FIG. 7a is an illustration of the output of a sensor in accordance with the present invention when a single note is detected.
Figure 7B:
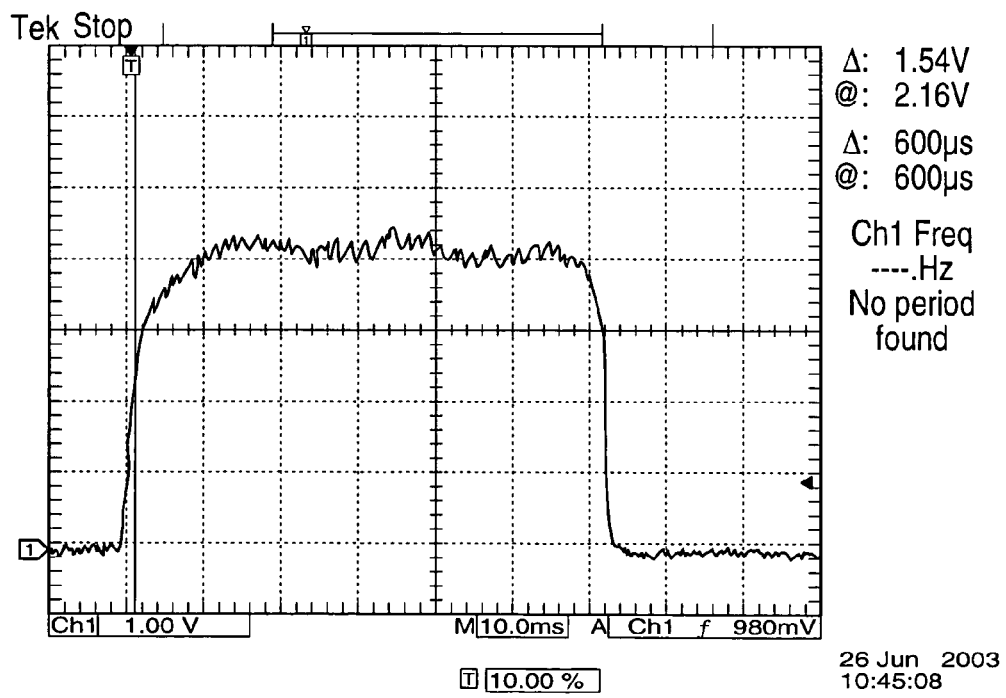
FIG. 7b is an illustration of the output of a sensor in accordance with the present invention when two notes are detected.

FIG. 6 illustrates the feedback circuit required to enable the maintenance of a constant sensor output, in the detector in accordance with the present invention.

The Compensated Opacity Schematics

The Loop Reaction Speed Depends On:

The charge current delivered from the driver circuit to the charge capacitor

The efficiency of the LED. Higher efficiency demands less current and thus speeds_up the charge of the charge capacitor as well as it demands less change in a given situation and thus speeds up the loop reaction.

The phototransistor load resistor. A smaller load resistor (greater load) depletes the base region of the phototransistor faster and allows for a faster turn off.

The load of the charge capacitor. The smaller the two resistors R3 and R4 are the faster the charge capacitor can be depleted.

The charge capacitor. A smaller capacitor is charged and depleted faster.

The inductor. A larger inductor increases the drive current.

Closed Loop

The LED (D4) and the phototransistor (U2) are physically positioned such that U2 receives light from D4. This light path, together with the FB input of U1, creates a closed loop. The loop balances when the voltage $U_{FB}$ to GND is approximately 0.252 [V].

Reduction of Light

By reducing the photo current in U2 (reduction of light received by U2) the voltage $U_{FB}$ is reduced. This results in a current increase delivered by U1 and thus (over time) a voltage increase across C1 which in turn results in a current increase in D2, D3, D4, R4 and R3. A current increase in D4 (white LED) gives a rise in the light produced and equilibrium is restored. As this results in a current increase in R3 the output voltage increases with the light increase.

Over Voltage Protection and Maximum Current

U1 has a built-in over voltage protection circuit, which prevents the voltage across C1 from rising beyond 27.5 [V].

The maximum current that can pass through D4 is thus given by $$I_{D4max}=(U_{OVP}-U_{D2+D3+D4})/(R_3+R_4)=(27.5-(0.7+0.7+4))/(68+270)=65\ [mA]$$

Maximum Output Voltage

The maximum output voltage is given by the maximum current through R3.

$$U_{o\_max}=I_{D4max}*R3=0.065*68=4.42[V]$$

Avoiding Closed Loop Oscillations

If U1 is capable of charging C1 faster than U2 can change the photo current then the feed back voltage ($U_{FB}$) will change too slowly and a $U_{C1}$ overshoot will be the result which in turn gives excess D4 current and thus excess light.

The rise time created by U2 and its load resistor (R2) must be so much smaller than the charging of C1 that the resultant overshoot can be accepted. The actual speed with which C1 is charged by U1 depends on a set of factors which depends on the efficiency of the boost converter formed by U1/L1. Experiments are needed to obtain these data. A good result is achieved for R2=100k, L1=5.6 uH and C1=10 uF.

LED On Time

When a more opaque media is introduced into the light path the feed-back loop increases the LED current to compensate for the measured light loss. The LED ON_time depends on the speed with which the driver can increase the drive voltage (charge the charge capacitor) and thus the LED current. This in turn depends on the maximum drive current and the size of the charge capacitor.

A larger capacitor reduces the ON time at the delivered current and vice versa.

The current being delivered depends on the inductor. A larger inductor increases the current. The driver is limited to handle inductors below 27 uH.

By using over current (70 mA versus 20 mA) the LED On Time is reduced. The total light path must be so efficient that a common bill results in a LED current of 20 [mA] or less. The light path should not permanently be obstructed as this will lead to decreased lifetime.

The higher the LED efficiency is the less current is used to create light and similarly more current is available to charge the charge capacitor.

LED Off Time

The speed with which the light output will be reduced depends on the capacity of C1 given that U1 can switch off in a few microseconds. The C1 discharge path depends on R3 and R4 assuming that the forward voltages of the diodes are reasonably constant.

$$\tau = R*C = (68+270)*10u = 3.38 \ [ms]$$

This is too slow. A $\tau$ of less than 0.3 [ms] is wanted.

This can be achieved by increasing max current. A higher max current will result in smaller resistors. However a higher max current stresses the LED! This also demands a faster phototransistor/resistor pair, as C1 will charge faster.

FIG. 8 is a cross section of a detector 60 formed through the axes of the rotating shafts in a pair of pinch rollers. The note path 62 is perpendicular to the plane of the figure. Light follows a path from the emitter 16 into the rotating light guide tube 20 via an integral-collimating lens. It travels in a parallel manner through the tube 20 until half of the light reaches the first internal reflecting surface 64A. The reflected light is directed to travel across the path 66A of the object document 68. The other half of the light travels further onto a second reflecting surface 64 B whereupon it is reflected across the path 66B of the object document 68 in the same way. The light returns to the light sensor 18 using a similar, symmetrical path.

The amplitude of the signal received by the sensor 18 combined with feedback control of the emitter is monitored to establish various parameters of the note 68 and its dynamics, as discussed above.

By constructing a cylindrical light guide producing dual light beams and integrating a pair of them. into a feed roller assembly, media to be characterized is compressed by the pinch rolls ensuring that it is held perpendicular to the light beams at the point of measurement acquisition. Further, the air gap to be traversed by the light beams is significantly reduced, relative to the planar light guide technique, which reduces the loss of intensity due to beam spreading.

Modifications may be incorporated without departing from the scope of the present invention.

What is claimed is:

1. An optical media detector for use in media transport mechanism, the detector comprising:
   a light source;
   an optical sensor; and
   a pair of optical light guides which provide, at least in part, two distinct optical paths between the light source and the optical sensor, at least a portion of each of the optical light guides comprising at least a portion of an associated pinch roller for contacting media being transported.

2. A detector as claimed in claim 1, wherein each of the light guides is formed with a substantially cylindrical cross-section.

3. A detector as claimed in claim 2, wherein each light guide includes a portion with a substantially cylindrical cross-section which forms part of the pinch roller.

4. A detector as claimed in claim 3, wherein each light guide includes a surface for contacting media when in use.

5. A detector as claimed in claim 3, wherein each light guide includes a surface which is recessed from media when in use.

6. A detector as claimed in claim 5, wherein the light guides are recessed on the order of one millimeter.

7. A detector as claimed in claim 1, wherein the light guides are formed from a plastic material.

8. A detector as claimed in claim 1, wherein the optical sensor comprises a single optical sensor.

9. A detector as claimed in claim 1, wherein the light guides comprise optical wave-guides.

10. A detector as claimed in claim 1, further comprising control means for providing double pick information based upon an output signal of the optical sensor.

11. A detector as claimed in claim 1, wherein (i) the optical sensor receives light via each optical path, and (ii) an output signal of the optical sensor is dependent on whether or not a media item is present in either one optical path or both optical paths.

12. A detector as claimed in claim 11, further comprising control means for determining degree of skew of a media item based upon an output signal of the optical sensor.

13. A detector as claimed in claim 1, wherein the light source comprises a Light Emitting Diode (LED).

14. An apparatus comprising:
   a pinch roller portion comprising at least two pinch rollers having surfaces for engaging a media item which is being transported along a media transport path; and
   a light guide portion and including means defining two distinct optical paths for guiding light between a light source and a light sensor, a portion of the light guide forming at least a part of each of the pinch rollers.

15. An apparatus as claimed in claim 14, wherein the light guide portion includes a surface for contacting media when in use.

16. An apparatus as claimed in claim 14, wherein the light guide portion includes a surface which is recessed from media when in use.

17. An apparatus as claimed in claim 16, wherein the surface of the light guide portion is recessed on the order of one millimeter.

18. An apparatus as claimed in claim 14, wherein the light guide portion comprises a substantially cylindrical cross-section.

19. An apparatus as claimed in claim 14, wherein the light guide portion comprises a plastic material.

20. A method of operating an optical media detector having a pair of light guides which provide at least part of two distinct optical paths between a light source and a light sensor and in which at least a portion of each light guide forms at least part of an associated pinch roller, the method comprising:
   engaging surfaces of the pinch rollers against a media item which is being transported along a media transport path which passes between the pinch rollers; and
   directing light from the light source to the light sensor along the two optical paths while the surfaces of the pinch rollers are engaging the media item as the media item is being transported along the media transport path.

* * * * *